US010366829B2

(12) United States Patent
Kessoku et al.

(10) Patent No.: US 10,366,829 B2
(45) Date of Patent: Jul. 30, 2019

(54) COIL ASSEMBLY FOR NON-CONTACT CHARGING

(71) Applicants: Kenichi Kessoku, Aichi (JP); Tokihiko Sugiura, Aichi (JP); Tsuyoshi Higashikata, Aichi (JP)

(72) Inventors: Kenichi Kessoku, Aichi (JP); Tokihiko Sugiura, Aichi (JP); Tsuyoshi Higashikata, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 8 days.

(21) Appl. No.: 15/454,069

(22) Filed: Mar. 9, 2017

(65) Prior Publication Data

US 2017/0263377 A1 Sep. 14, 2017

(30) Foreign Application Priority Data

Mar. 9, 2016 (JP) ................................ 2016-045246

(51) Int. Cl.
*H01Q 1/52* (2006.01)
*H02J 7/00* (2006.01)
*H01F 38/14* (2006.01)
*H01F 27/36* (2006.01)

(52) U.S. Cl.
CPC .......... *H01F 38/14* (2013.01); *H01F 27/365* (2013.01); *H01Q 1/521* (2013.01)

(58) Field of Classification Search
CPC ...................................................... H01F 38/14
USPC ...................................................... 320/108
See application file for complete search history.

(56) References Cited

U.S. PATENT DOCUMENTS

2014/0168019 A1 6/2014 Hirobe et al.
2015/0222148 A1* 8/2015 Sampei .................. H02J 5/005 307/104
2018/0351414 A1* 12/2018 Park ....................... H02J 50/40

FOREIGN PATENT DOCUMENTS

JP 2013-98846 A 5/2013
JP 2015-144508 A 8/2015

* cited by examiner

*Primary Examiner* — Edward Tso
*Assistant Examiner* — Ahmed H Omar
(74) *Attorney, Agent, or Firm* — Osha Liang LLP

(57) ABSTRACT

A coil assembly for non-contact charging has a power supplying surface facing a power receiving device and is provided in a power transmission device which wirelessly transmits power to the power receiving device. The coil assembly includes: a first coil; a second coil which is positioned as close as or farther than the first coil from the power supplying surface; and a magnetic body which is positioned farther than the second coil from the power supplying surface, and overlaps with the second coil and does not overlaps with the first coil when seen from the power supplying surface.

4 Claims, 5 Drawing Sheets

100B
50B
20B
30B
20B
20B
10B 60B
20B
20B
50B
10B
20B 30B
40B
40B

COIL ASSEMBLY FOR NON-CONTACT CHARGING

CROSS-REFERENCES TO RELATED APPLICATIONS

This application is based upon and claims the benefit of priority from Japanese Patent Application No. 2016-045246, filed on Mar. 9, 2016, the entire contents of which are incorporated herein by reference.

FIELD

One or more embodiments of the present invention relate to a coil assembly for non-contact charging which transmits power in a non-contact manner, and particularly, to a coil assembly for non-contact charging which causes two different types of coils to coexist and be used.

BACKGROUND

In the related art, coil assemblies are proposed in which two different types of coils are caused to coexist and which transmit power in a non-contacting manner with a compact configuration. For example, JP-A-2013-098846 discloses a coil for non-contacting power transmitting which is capable of realizing space saving while suppressing performance deterioration of each coil, in a case in which a plurality of coils such as the coil for non-contacting power transmitting are caused to coexist. In the coil for non-contacting power transmitting, a first magnetic body, a first coil for non-contacting power transmitting, a second magnetic body, a substrate, and a second coil for non-contacting wireless communication positioned on an external equipment side are sequentially stacked and disposed in a thickness direction of the coil. The first coil and the second coil are disposed in a state in which at least parts thereof overlap with each other, and are disposed so that there is a region where the second coil does not overlap with the first coil on an inner peripheral side of the first coil and the second coil overlaps with the first coil near an outer peripheral of the first coil.

In addition, JP-A-2015-144508 discloses a wireless power transmitting system which is capable of corresponding to two transmission methods and suppressing deterioration of transmission efficiency to a power receiving device from a power transmission device. The wireless power transmitting system wirelessly transmits the power to the power receiving device from the power transmission device using a magnetic field coupling of a power transmitting coil and a power receiving coil. The power transmission device includes a power transmission circuit which generates an electric signal for transmitting power, a first power transmitting coil corresponding to a first transmission method, a second power transmitting coil corresponding to a second transmission method, a first magnetic body on which the first power transmitting coil is mounted, a second magnetic body on which the second power transmitting coil is mounted, and a power supplying surface on which the power receiving device is mounted. Also, a first attaching surface of the first magnetic body and a second attaching surface of the second magnetic body are positioned on a lower side of the power supplying surface, and are disposed on a same plan surface parallel to the power supplying surface.

SUMMARY

In the coils described above, a magnetic body for intensifying a magnetic field is correspondingly provided to each of coils, the coils inhibit each other due to their disposition of coils, which gives an influence to charging efficiency.

One or more embodiments of the invention have been made under consideration of such circumstances, and it is possible to provide a coil assembly for non-contact charging in which the magnetic body is not correspondingly provided to one coil, two types of charging methods are integrated together, spaces are saved, and charging efficiency is favorable.

In accordance with one or more embodiments of the invention, there is provided a coil assembly for non-contact charging which has a power supplying surface facing a power receiving device and is provided in a power transmission device which wirelessly transmits power to the power receiving device, the coil assembly including: a first coil; a second coil which is positioned as close as or farther than the first coil from the power supplying surface; and a magnetic body which is positioned farther than the second coil from the power supplying surface, and overlaps with the second coil and does not overlap with the first coil when seen from the power supplying surface.

Accordingly, the magnetic body is not correspondingly provided to the first coil, and the first coil is disposed at a position where the magnetic body correspondingly provided to the second coil only has a small influence, and thus it is possible to provide the coil assembly for non-contact charging in which two types of charging methods are integrated together, spaces are saved, and charging efficiency is favorable.

The first coil may be disposed at an outside of the second coil and the magnetic body.

Accordingly, the first coil is disposed on the power receiving device side and at the outside of the second coil and the magnetic body, and thus it is possible to most reduce the influence of the magnetic body correspondingly provided to the second coil on the first coil.

The coil assembly for non-contact charging further includes a control board, the control board may be positioned farther than the magnetic body from the power supplying surface, and may be disposed at an inside of the first coil.

Accordingly, a size of the coil assembly including the control board can be smaller than or equal to the first coil, and thus space thereof can be saved.

As described above, according to one or more embodiments of the invention, it is possible to provide the coil assembly for non-contact charging in which two types of charging methods are integrated together, spaces are saved, and charging efficiency is favorable.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the invention will be described with reference to drawings. First, with reference to FIG. 5, a coil assembly for non-contact charging 100Z in the related art will be described. The coil assembly for non-contact charging 100Z is provided in a power transmission device SDZ which wirelessly transmits power to a power receiving device RD such as a mobile terminal. The coil assembly for non-contact charging 100Z is provided with a first coil 10Z of a magnetic field resonance coil, a magnetic body 30Z1 corresponding to the first coil 10Z, a second coil 20Z of electromagnetic induction coil, a magnetic body 30Z2 corresponding to the second coil 20Z, a printed circuit board 50Z, in which circuits for controlling, or the like these members are disposed. The magnetic body 30Z1 and the magnetic body 30Z2 are respectively correspondingly provided to the first coil 10Z and the second coil 20Z, and function so as to intensify magnetic fields of the first coil 10Z and the second coil 20Z.

Figure 5:
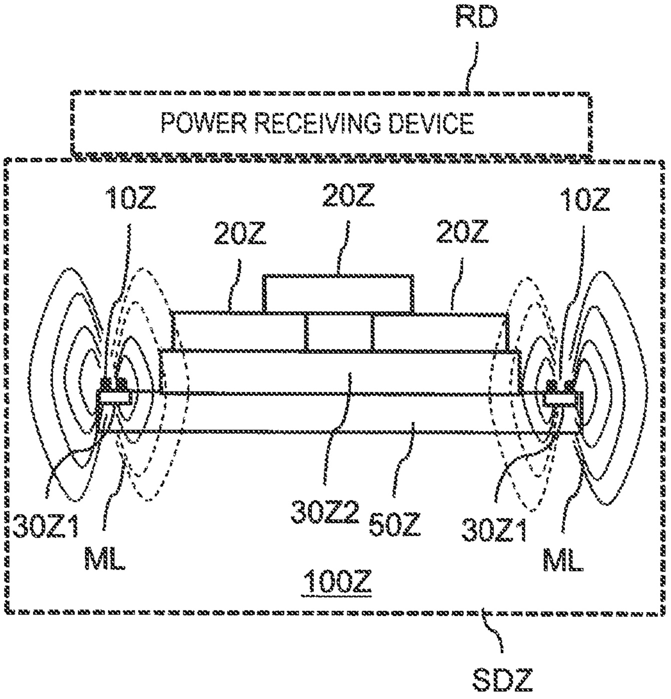
FIG. 5 is a schematic view illustrating magnetic field lines in a coil assembly for non-contact charging of the related art.

The first coil 10Z is positioned farther than the second coil 20Z from the power receiving device RD, and is positioned as far as or farther than the magnetic body 30Z2. Thus, as illustrated in FIG. 5, a part of the magnetic field lines of the first coil 10Z is weakened by the magnetic body 30Z2 of the second coil 20Z (magnetic field lines illustrated by dotted lines). Therefore, in the coil assembly for non-contact charging 100Z of such a related art, the first coil 10Z and the second coil 20Z inhibit each other due to their disposition relationship, which gives an adverse influence to charging efficiency. In one or more embodiments of the invention, without giving the adverse influence to the charging efficiency, it is possible to provide the coil assembly for non-contact charging in which two different types of charging methods are integrated together, spaces are saved, and charging efficiency is favorable.

First Embodiment

Figure 1A:
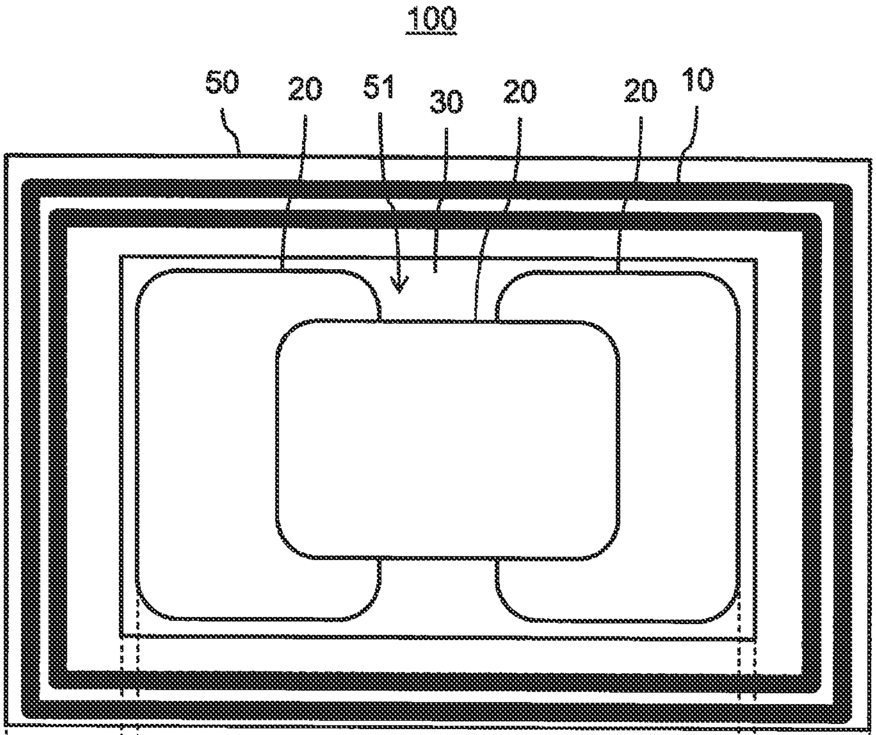
FIG. 1A is a plan view and FIG. 1B is a side view of a coil assembly for non-contact charging of a first embodiment of the invention.
Figure 1B:
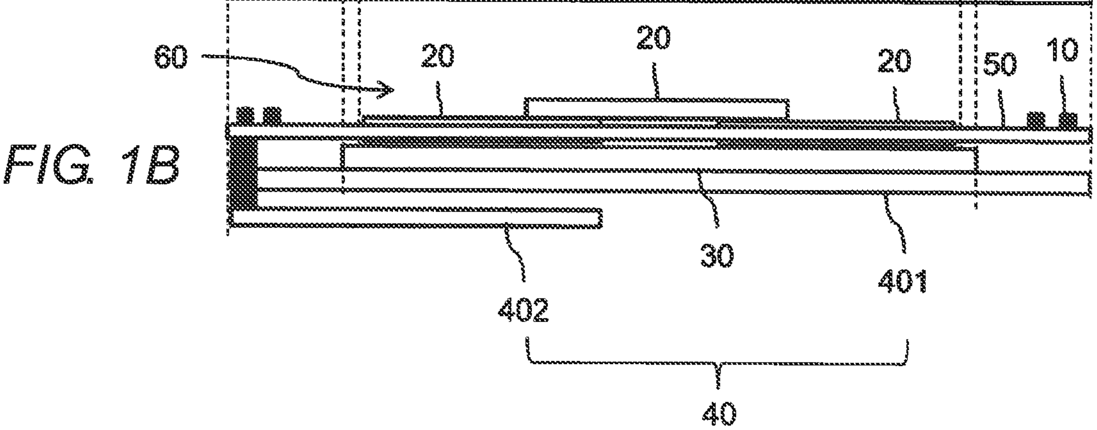

With reference to FIG. 1, the coil assembly for non-contact charging 100 in this embodiment will be described. The coil assembly for non-contact charging 100 is provided in the power transmission device SD which wirelessly transmits power to the power receiving device RD of a mobile terminal, or the like, and includes a power supplying surface 60 facing the power receiving device RD. The power supplying surface 60 means a surface parallel to a coil surface of a coil of the coil assembly for non-contact charging 100 which is the closest to the power receiving device RD. As a so-called wireless charging method of supplying power with respect to the power receiving device RD of a terminal device, or the like in wireless manner, there are roughly two main methods. One is an electromagnetic induction method using electromagnetic wave of 100 KHz to 200 KHz, and the other is a magnetic field resonance method using electromagnetic wave of 6.78 MHz. Therefore, the power transmission device is required to correspond to such two types of the wireless charging methods.

The power transmission device SD is provided with two types of coils in order to correspond to such two types of the wireless charging methods. The coil assembly for non-contact charging 100 is provided with the first coil 10, the second coil 20, the magnetic body 30, a control board 40, and a printed circuit board 50. The printed circuit board 50 is a rectangular circuit substrate which is disposed to be the closest to the power receiving device RD, and includes a rectangular opening portion 51 which is substantially same as an exterior of the printed circuit board on the center thereof.

The first coil 10 is a coil for the magnetic field resonance method, and is provided with a frame portion sandwiched between the opening portion 51 of the printed circuit board 50 and a periphery thereof. The first coil 10 is positioned to be closest to the power supplying surface 60, and is a coil which is wound in a rectangular ring shape by a wiring pattern of a conductor formed on the printed circuit board 50. Moreover, the first coil 10 does not accompany the magnetic body for intensifying a magnetic field as the magnetic body 30 correspondingly provided with the second coil 20 to be described later. Since the first coil 10 is disposed at a position closest to the power receiving device RD, the first coil is capable of sufficiently functioning as a coil without such a magnetic body.

The control board 40 is provided with a first control board 401 close to the power receiving device RD, and a second control board 402 distant from the device in substantially parallel to the printed circuit board 50. The first control board 401 is provided with the rectangular plate shaped magnetic body 30 on a surface of the power receiving device RD side, but the magnetic body 30 is provided to be disposed distant from the power supplying surface 60 (power receiving device RD) farther than the printed circuit board 50. That is, a thickness of the magnetic body 30 is less than a distance between the first control board 401 and the printed circuit board 50. Then, the magnetic body 30 is positioned distant from the power supplying surface 60 (power receiving device RD) farther than the first coil 10.

In addition, a shape of the magnetic body 30 when seen in a plan view, is substantially same as a rectangular shape of the opening portion 51 of the printed circuit board 50, and the magnetic body 30 is disposed to be coincide with the opening portion 51 of the printed circuit board 50 when seen in a plan view. Then, since the first coil 10 is positioned on the frame portion sandwiched between the opening portion 51 and an outer peripheral portion, the magnetic body 30 has no part overlapping with the first coil 10 when seen from the power receiving device RD. Moreover, the magnetic body 30 is made of a material, such as ferrite having a permeability of greater than or equal to 1.

The second coil 20 is a coil of the electromagnetic induction method, and is provided on the magnetic body 30 on the power receiving device RD side, and disposed to be fitted in the opening portion 51 of the printed circuit board 50. Therefore, the second coil 20 overlaps with the magnetic body 30 when seen from the power supplying surface 60 (power receiving device RD), and is disposed at a position where the distance from the power supplying surface 60 is substantially the same as the distance from the power supplying surface 60 to the first coil 10 and is shorter than the distance from the power supplying surface 60 to the first coil 10. The second coil 20 is configured with three flat coils wound in a rectangular ring shape, but it is exemplified as an example using the three coils in order to increase magnetic flux and to secure flexibility of an axial center position. It is not limited thereto, and thus one coil may be used, or more coils may be used.

If in a case in which a magnetic body is present under the first coil 10, the magnetic body is disposed right beside the second coil 20, and thus receiving influence of the magnetic body may cause deterioration of charging efficiency. However, since the magnetic body correspondingly provided to the first coil 10 is not provided in the coil assembly for non-contact charging 100, the second coil 20 is not influenced by the magnetic body for the first coil 10, and the first coil 10 is disposed at a position where the magnetic body 30 for the second coil 20 only has a small influence, and thus an adverse effect is not generated in charging efficiency.

As described above, the coil assembly for non-contact charging 100 of the power transmission device SD is configured with the first coil 10 positioned closest to the power supplying surface 60, the second coil 20 in which coil surfaces are substantially parallel to each other and positioned at a position where the distance from the power supplying surface 60 as compared to the first coil 10, and the flat magnetic body 30 which is substantially parallel to the coil surface and is disposed at a position distant from the power supplying surface 60 farther than the second coil 20, overlaps with the second coil 20 when seen from the power supplying surface 60, but does not overlap with the first coil 10, are stacked sequentially from the power supplying surface 60 (power receiving device RD) side in a thickness direction (vertical direction of FIG. 1B) of the coil. According to the configuration, the first coil 10 is not correspondingly provided with the magnetic body, and the first coil 10 is disposed at a position where the magnetic body 30 correspondingly provided to the second coil 20 only has a small influence, and thus it is possible to provide the coil assembly for non-contact charging 100 in which two types of charging methods are integrated together, spaces are saved, and charging efficiency is favorable.

In addition, since the first coil 10 is positioned at a frame portion sandwiched between the opening portion 51 of the printed circuit board 50 and the periphery, and the second coil 20 and the magnetic body 30 are positioned to be fitted into the opening portion 51, the first coil 10 is disposed to the outside of the second coil 20 and the magnetic body 30. As described above, when the first coil is disposed on the power receiving device side and the outside with respect to the second coil and the magnetic body, it is possible to most reduce the influence of the magnetic body correspondingly provided to the second coil on the first coil.

The control board 40 is disposed at a position farther than the magnetic body 30 from the power supplying surface 60, and is disposed on the inside of the first coil 10. Accordingly, since a size of the first coil assembly including the control board can be smaller than or equal to the first coil when seen in a plan view, a space can be more saved, and an area of a coil surface can be maximized.

Second Embodiment

Figure 2A:
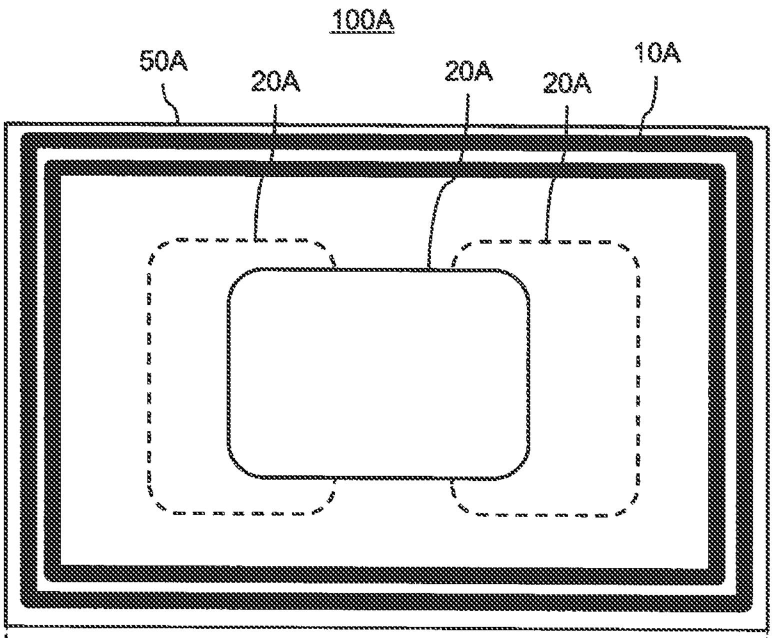
FIG. 2A is a plan view and FIG. 2B is a side view of a coil assembly for non-contact charging of a second embodiment of the invention.

With reference to FIG. 2, a coil assembly for non-contact charging 100A in this embodiment will be described. The coil assembly for non-contact charging 100A is provided with a power supplying surface 60A facing the power receiving device RD, a first coil 10A, a second coil 20A, a magnetic body 30A, a control board 40A, and a printed circuit board 50A. The printed circuit board 50A is a rectangular circuit substrate which is disposed at a position close to the power receiving device RD, and in the embodiment, there are a plurality of the printed circuit boards 50A.

The first coil 10A is a coil for the magnetic field resonance method, and is provided in a circuit substrate closest to the power supplying surface 60A (power receiving device RD) in the printed circuit board 50A. The first coil 10A is a coil wound around near the outer edge in rectangular ring shape by a wiring pattern of a conductor formed on the printed circuit board 50A. Moreover, the first coil 10A does not accompany a magnetic body for intensifying a magnetic field as the magnetic body 30A being correspondingly provided to the second coil 20A to be described later. Since the first coil 10A is disposed at a position closest to the power receiving device RD, the first coil is capable of sufficiently functioning as a coil without such a magnetic body.

The second coil 20A is a coil of the electromagnetic induction method, and is provided on the circuit substrate closest to the power receiving device RD in the printed circuit board 50A and is provided at the substantial center of three printed circuit boards 50A in a direction distant from the power receiving device RD. Then, the second coil 20A is positioned at a position where the distance from the power receiving device RD is the substantially same distance as the first coil 10A and the second coil 20A is substantially the same as or longer than the distance from the power receiving device RD to the first coil 10A. The second coil 20A is a coil would around in a rectangular ring shape by a wiring pattern of a conductor formed on the printed circuit board 50A, and the second coil 20A is also stacked and disposed in order to improve charging efficiency by stacking the printed circuit board 50A.

The control board 40A is provided with the magnetic body 30A of a rectangular plate shape on a surface of the power receiving device RD side, and is disposed so that the magnetic body 30A is stacked with the second coil 20A disposed on the printed circuit board 50A which is farthest from the power receiving device RD. Then, the magnetic body 30A is positioned distant from the first coil 10A with respect to the power receiving device RD.

In addition, a shape of the magnetic body 30A when seen in a plan view is similar to a rectangular shape of the printed circuit board 50A, and the magnetic body 30A is disposed to be coincide with the second coil 20A on the printed circuit board 50A when seen in a plan view. Then, since the first coil 10A is positioned near an outer edge of the printed circuit board 50A closet to the power receiving device RD, the magnetic body 30A does not have a part overlapping with the first coil 10A when seen from the power receiving device RD, and the second coil 20A overlaps with the magnetic body 30A when seen from the power receiving device RD.

If there is the magnetic body under the first coil 10A, the magnetic body is positioned right beside the second coil 20A, and it may cause deterioration of charging efficiency by receiving influence of the magnetic body. However, since the magnetic body being correspondingly provided with the first coil 10A is not provided in the coil assembly for non-contact charging 100A, the second coil 20A is not influenced by the magnetic body for the first coil 10A, and the first coil 10A is disposed at a position where the magnetic body 30A for the second coil 20A only has a small influence, and thus an adverse effect is not generated in charging efficiency.

Figure 2B:
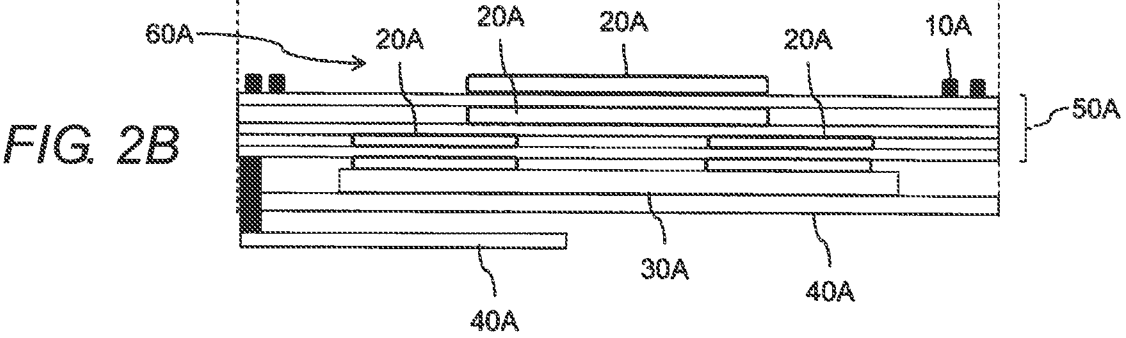

As described above, the coil assembly for non-contact charging 100A of the power transmission device SD is provided with the first coil 10A, the second coil 20A in which the coil surfaces are substantially parallel to each other at a position where the distance from the power receiving device RD is longer than or substantially the same as the distance from the power the first coil 10A, the flat magnetic body 30A of receiving device RD to substantially parallel with the coil surface which is positioned distant from the power receiving device 30 farther than the second coil 20A, overlaps with the second coil 20A, and does not overlap with the first coil 10A, are stacked sequentially from the power receiving device RD side in the thickness direction of the coil (vertical direction in FIG. 2B). According to the configuration, the magnetic body is not correspondingly provided to the first coil 10A, and the first coil 10A is disposed at a position where the magnetic body 30A being correspondingly provided to the second coil 20A only has a small influence, and thus it is possible to provide the coil assembly for non-contact charging 100A in which two types of charging methods are integrated together, spaces are saved, and charging efficiency is favorable.

Third Embodiment

Figures 3A, 3B:
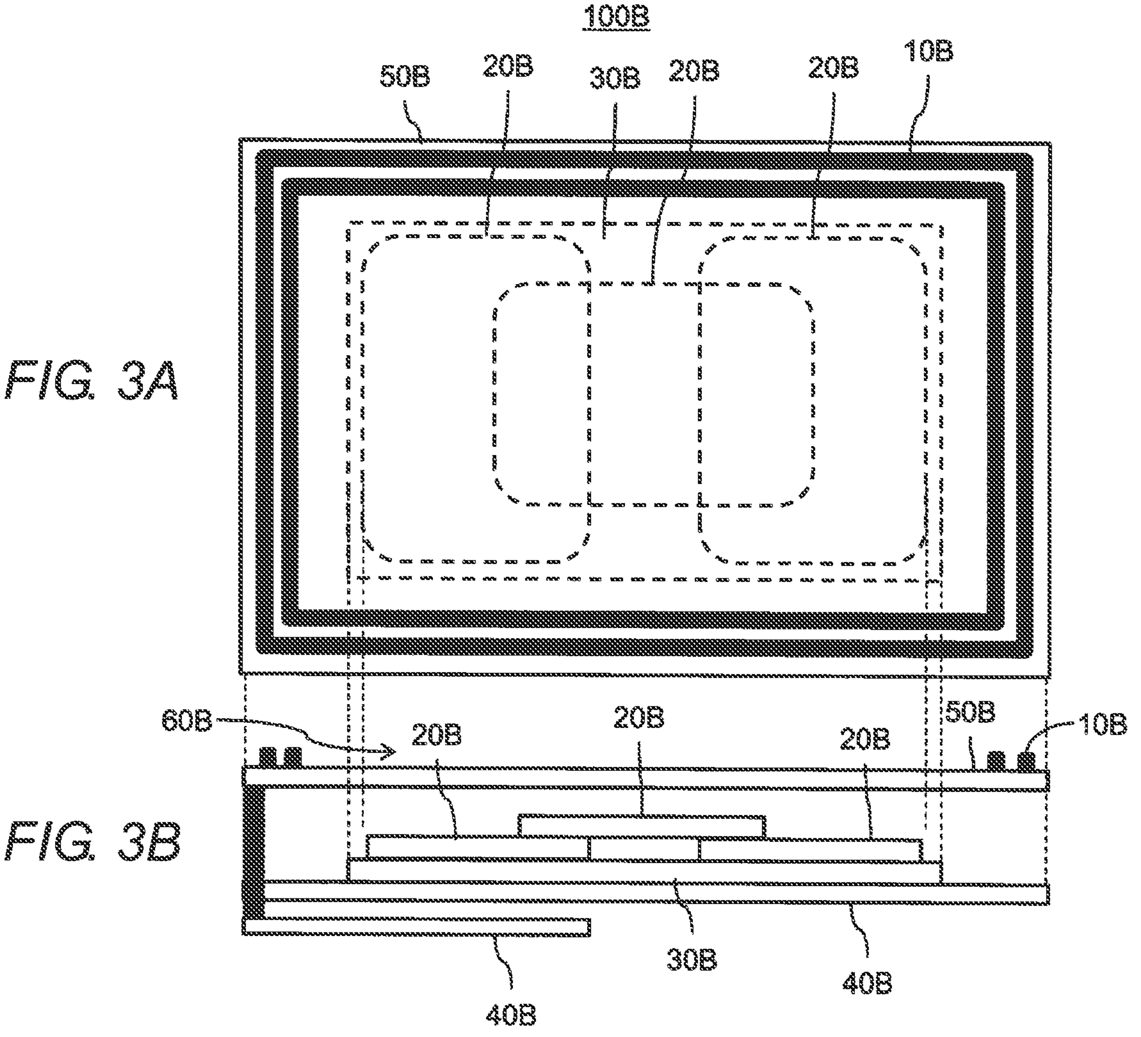
FIG. 3A is a plan view and FIG. 3B is a side view of a coil assembly for non-contact charging of a third embodiment of the invention.

With reference to FIG. 3, a coil assembly for non-contact charging 100B in this embodiment will be described. The coil assembly for non-contact charging 100B includes a power supplying surface 60B facing the power receiving device RD, and is provided with a first coil 10B at a position closest to the power supplying surface 60B, a second coil 20B, a magnetic body 30B, a control board 40B, and a printed circuit board 50B. The printed circuit board 50B is a rectangular flexible circuit substrate positioned closest to the power receiving device RD.

The first coil 10B is a coil for the magnetic field resonance method, and is provided on the printed circuit board 50B positioned closest to the power supplying surface 60B. The first coil 10B is a coil wound around near the outer edge in a rectangular ring shape by a wiring pattern of a conductor on the flexible printed circuit board 50B. Moreover, the first coil 10B does not accompany the magnetic body for improving a magnetic field as the magnetic body 30B correspondingly provided with the second coil 20B to be described later. Since the first coil 10B is disposed at a position closest to the power receiving device RD, the first coil is capable of sufficiently functioning as a coil without such a magnetic body.

The control board 40B is disposed to be substantially parallel to the printed circuit board 50B, and the magnetic body 30B of a rectangular plate shape is provided on a surface of the power receiving device RD side, but the magnetic body 30B is positioned distant from the power receiving device RD farther than the printed circuit board SOB. Then, the magnetic body 30B is positioned distant from the power receiving device RD farther than the first coil 10B.

In addition, a shape of the magnetic body 30B when seen in a plan view is similar to a rectangular shape of the printed circuit board 50B, and the magnetic body 30B is disposed at the center of the printed circuit board 50B when seen in a plan view. Then, since the first coil 10B is positioned near the outer edge of the printed circuit board 50B, and the magnetic body 30B does not have a part overlapping with the first coil 10B when seen from the power receiving device RD.

The second coil 20B is a coil of the electromagnetic induction method, and is provided on the center of the printed circuit board 50B so as to be stacked on the magnetic body 30B on the power receiving device RD side. Therefore, the second coil 20B overlaps with the magnetic body 30B when seen from the power supplying surface 60B (power receiving device RD), and is disposed at a position where a distance from the power supplying surface 60B is longer than the distance from the power supplying surface 60B to the first coil 10B and at a position where the distance from the power supplying surface 60B is shorter than the distance from the power supplying surface 60B the magnetic body 30B. The second coil 20B is configured with three flat coils wound in a rectangular ring shape.

If there is the magnetic body under the first coil 10B, the magnetic body is positioned at the power receiving device RD side when seen from the second coil 20B, and thus it may cause deterioration of charging efficiency by receiving an influence of the magnetic body. However, in the coil assembly for non-contact charging 100B, since the magnetic body being correspondingly provided with the first coil 10B is not provided, the second coil 20B is not influenced by the magnetic body for the first coil 10B. Also, the first coil 10B is disposed at a position where the magnetic body 30B for the second coil 20B only has a small influence, and thus an adverse effect is not generated in charging efficiency.

Figure 4A:
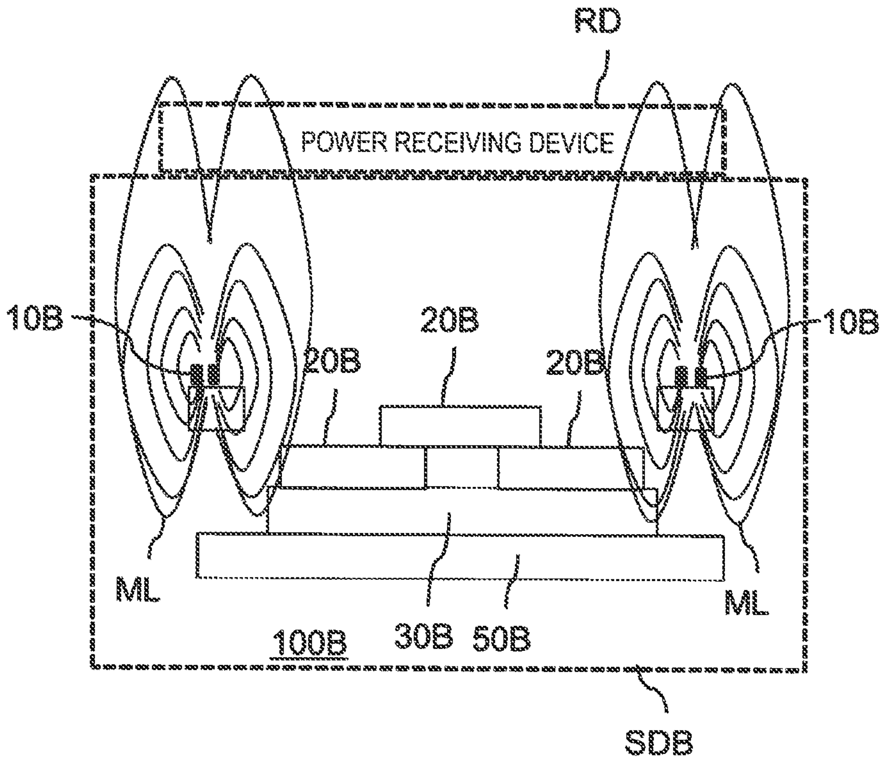
FIG. 4A is a schematic view illustrating magnetic field lines of a first coil and FIG. 4B is a schematic view illustrating magnetic field lines of a second coil of the third embodiment of the invention.

That is, as illustrated in FIG. 4A, the first coil 10B is positioned closer than the second coil 20B is when seen from the power receiving device RD, and weakening of the magnetic field lines with respect to the power receiving device RD of the first coil 10B due to the magnetic body 30B for intensifying a magnetic field of the second coil 20B is reduced (magnetic field lines shown by solid lines). In addition, as illustrated in FIG. 4B, the magnetic field lines ML by the second coil 20B intensifies a magnetic field by the magnetic body 30B.

Figure 4B:
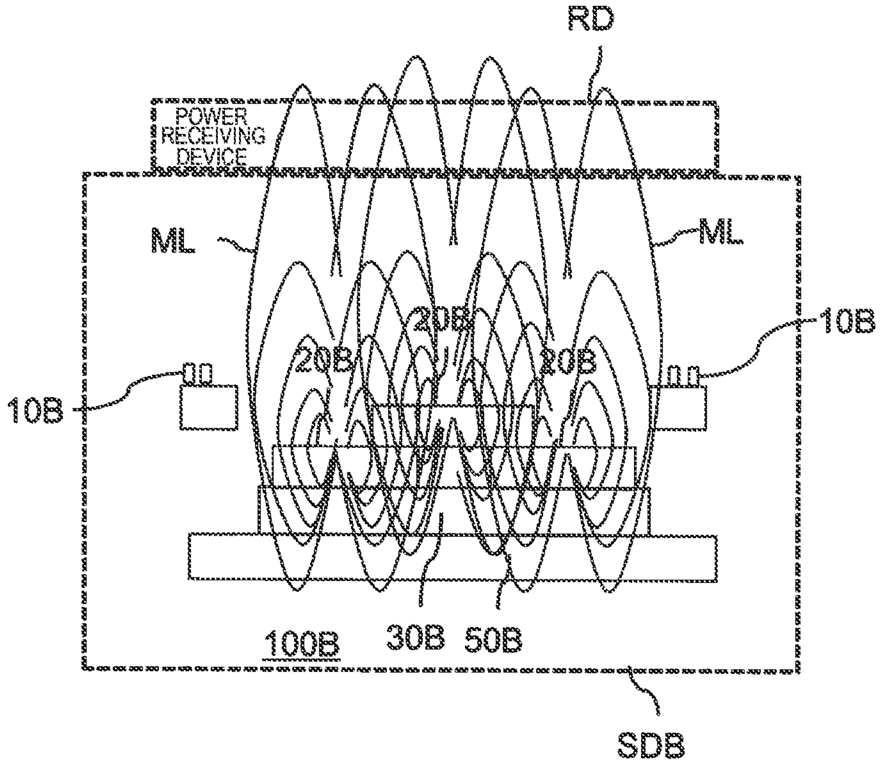

As described above, the coil assembly for non-contact charging 100B of the power transmission device SD is provided with the first coil 10B, the second coil 20B, in which coil surfaces are substantially parallel to each other, disposed at a position (distant position) where the distance from the power receiving device RD is greater than the distance from the power receiving device RD to the first coil 10B, and the magnetic body 30B which is a flat board substantially parallel with the coil surface disposed at a position which overlaps the second coil 20B and does not overlap with the first coil 10B farther from the power receiving devices RD than the second coil 20B is, which are stacked sequentially from the power receiving device RD side in the thickness direction of a coil (vertical direction of FIG. 4B). According to the configuration, since the magnetic body is not correspondingly provided in the first coil 10B, the first coil 10B is disposed at a position where the magnetic body 30B being correspondingly provided with the second coil 20B only has a small influence, it is possible to provide the coil assembly for non-contact charging 100B in which two types of charging methods are integrated together, spaces are saved, and charging efficiency is favorable.

Moreover, one or more embodiments of the invention is not limited to the exemplified embodiment, and can be implemented with configurations within a scope not deviating from contents disclosed in each item of claims. That is, the invention has been particularly shown and described with certain embodiments, it is apparent to those skilled in the art that various modification can be made to the embodiments described above in numerous variation and other detailed configurations without departing from the spirit and scope of the invention.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A coil assembly for non-contact charging which has a power supplying surface facing a power receiving device and is provided in a power transmission device which wirelessly transmits power to the power receiving device, the coil assembly comprising:

a circuit board;

a first coil positioned directly onto the circuit board;

a second coil positioned as close as, or farther than, the first coil from the power supplying surface; and a single magnetic body that:

is positioned farther than the second coil from the power supplying surface, overlaps with the second coil, and does not overlap with the first coil when seen from the power supplying surface.

2. The coil assembly for non-contact charging according to claim 1, wherein the first coil is disposed at an outside of the second coil and the single magnetic body.

3. The coil assembly for non-contact charging according to claim 2, further comprising:

a control board that is different and distinct from the circuit board, wherein the control board is positioned farther than the single magnetic body from the power supplying surface, and is disposed at an inside of the first coil.

4. The coil assembly for non-contact charging according to claim 1, wherein the single magnetic body is positioned:

between portions of the first coil and farther than the circuit board from the power supplying surface.

* * * * *